(12) United States Patent
Cheung et al.

(10) Patent No.: US 9,274,851 B2
(45) Date of Patent: Mar. 1, 2016

(54) CORE-TRUNKING ACROSS CORES ON PHYSICALLY SEPARATED PROCESSORS ALLOCATED TO A VIRTUAL MACHINE BASED ON CONFIGURATION INFORMATION INCLUDING CONTEXT INFORMATION FOR VIRTUAL MACHINES

(75) Inventors: David Cheung, Cupertino, CA (US); Mani Prasad Kancherla, Milpitas, CA (US); Deepak Kothari, Cupertino, CA (US); Gary Hemminger, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 377 days.

(21) Appl. No.: 12/626,432

(22) Filed: Nov. 25, 2009

(65) Prior Publication Data

US 2011/0126196 A1 May 26, 2011

(51) Int. Cl.
*G06F 9/50* (2006.01)
*H04L 12/64* (2006.01)
*H04M 7/00* (2006.01)
*G06F 9/455* (2006.01)
*H04L 29/06* (2006.01)

(52) U.S. Cl.
CPC .......... *G06F 9/5077* (2013.01); *G06F 9/45533* (2013.01); *G06F 9/45537* (2013.01); *H04L 12/6418* (2013.01); *H04L 29/06176* (2013.01); *H04M 7/006* (2013.01)

(58) Field of Classification Search
CPC .............. G06F 9/45533; G06F 9/5077; G06F 9/45537; H04M 7/006; H04L 12/6418; H04L 29/06176

USPC ........ 718/1, 104; 370/406, 352–355; 709/251
See application file for complete search history.

(56) References Cited

U.S. PATENT DOCUMENTS

| 5,159,592 A | 10/1992 | Perkins |
| 5,278,986 A | 1/1994 | Jourdenais et al. |
| 5,410,710 A | 4/1995 | Sarangdhar et al. |

(Continued)

FOREIGN PATENT DOCUMENTS

| EP | 0887731 A1 | 12/1998 |
| EP | 0926859 A | 6/1999 |

(Continued)

OTHER PUBLICATIONS

"Brocade Serveriron ADX 1000, 4000, and 8000 Series Frequently Asked Questions," pp. 1-10, Copyright 2009, Brocade Communications Systems, Inc.

(Continued)

*Primary Examiner* — Meng An
*Assistant Examiner* — Abu Ghaffari
(74) *Attorney, Agent, or Firm* — Kilpatrick Townsend & Stockton LLP

(57) ABSTRACT

Techniques for providing core-based virtualization based upon cores provided by one or more processors of a system. A device such as a network device comprising multiple processor cores provides for core-based virtualization. According to one embodiment, a network device is provided comprising a first subsystem for processing packets received by the network device. The first subsystem may comprise a set of one or more processors, the one or more processors providing a plurality of cores. Each core in the plurality of cores may have associated memory resources.

20 Claims, 4 Drawing Sheets

(56) References Cited

U.S. PATENT DOCUMENTS

| | | |
|---|---|---|
| 5,550,816 A | 8/1996 | Hardwick et al. |
| 5,649,110 A | 7/1997 | Ben-Nun et al. |
| 5,701,502 A | 12/1997 | Baker et al. |
| 5,732,209 A | 3/1998 | Vigil et al. |
| 5,828,578 A | 10/1998 | Blomgren |
| 5,878,232 A | 3/1999 | Marimuthu |
| 5,878,264 A | 3/1999 | Ebrahim |
| 5,970,232 A * | 10/1999 | Passint et al. ............. 709/238 |
| 5,978,578 A | 11/1999 | Azarya et al. |
| 6,047,330 A | 4/2000 | Stracke, Jr. |
| 6,097,718 A | 8/2000 | Bion |
| 6,101,188 A | 8/2000 | Sekine et al. |
| 6,104,700 A | 8/2000 | Haddock et al. |
| 6,111,888 A | 8/2000 | Green et al. |
| 6,115,393 A | 9/2000 | Engel et al. |
| 6,119,200 A | 9/2000 | George |
| 6,161,169 A | 12/2000 | Cheng |
| 6,233,236 B1 | 5/2001 | Nelson et al. |
| 6,269,391 B1 * | 7/2001 | Gillespie ..................... 718/100 |
| 6,282,678 B1 | 8/2001 | Snay et al. |
| 6,331,983 B1 | 12/2001 | Haggerty et al. |
| 6,374,292 B1 | 4/2002 | Srivastava et al. |
| 6,397,242 B1 | 5/2002 | Devine et al. |
| 6,424,629 B1 | 7/2002 | Rubino et al. |
| 6,430,609 B1 | 8/2002 | Dewhurst et al. |
| 6,442,682 B1 | 8/2002 | Pothapragada et al. |
| 6,496,510 B1 | 12/2002 | Tsukakoshi et al. |
| 6,496,847 B1 | 12/2002 | Bugnion et al. |
| 6,526,054 B1 | 2/2003 | Li et al. |
| 6,567,417 B2 | 5/2003 | Kalkunte et al. |
| 6,570,875 B1 | 5/2003 | Hegde |
| 6,577,634 B1 | 6/2003 | Tsukakoshi et al. |
| 6,580,727 B1 | 6/2003 | Yim et al. |
| 6,587,469 B1 | 7/2003 | Bragg |
| 6,597,699 B1 | 7/2003 | Ayres |
| 6,604,146 B1 | 8/2003 | Rempe et al. |
| 6,608,819 B1 | 8/2003 | Mitchem et al. |
| 6,633,916 B2 | 10/2003 | Kauffman |
| 6,636,895 B1 | 10/2003 | Li et al. |
| 6,674,756 B1 | 1/2004 | Rao et al. |
| 6,675,218 B1 | 1/2004 | Mahler et al. |
| 6,678,248 B1 | 1/2004 | Haddock et al. |
| 6,680,904 B1 | 1/2004 | Kaplan et al. |
| 6,683,850 B1 | 1/2004 | Dunning et al. |
| 6,691,146 B1 | 2/2004 | Armstrong et al. |
| 6,704,925 B1 | 3/2004 | Bugnion |
| 6,711,357 B1 | 3/2004 | Brewer et al. |
| 6,711,672 B1 | 3/2004 | Agesen |
| 6,725,289 B1 | 4/2004 | Waldsprurger et al. |
| 6,731,601 B1 | 5/2004 | Krishna et al. |
| 6,732,220 B2 | 5/2004 | Babaian et al. |
| 6,763,023 B1 | 7/2004 | Gleeson et al. |
| 6,785,886 B1 | 8/2004 | Lim et al. |
| 6,789,156 B1 | 9/2004 | Waldsprurger |
| 6,791,980 B1 | 9/2004 | Li |
| 6,795,966 B1 | 9/2004 | Lim et al. |
| 6,847,638 B1 | 1/2005 | Wu |
| 6,854,054 B1 | 2/2005 | Kavanagh |
| 6,859,438 B2 | 2/2005 | Haddock et al. |
| 6,879,559 B1 | 4/2005 | Blackmon et al. |
| 6,880,022 B1 | 4/2005 | Waldsprurger et al. |
| 6,894,970 B1 | 5/2005 | McDermott, III et al. |
| 6,898,189 B1 | 5/2005 | Di Benedetto et al. |
| 6,910,148 B1 | 6/2005 | Ho et al. |
| 6,938,179 B2 | 8/2005 | Iyer et al. |
| 6,944,699 B1 | 9/2005 | Bugnion et al. |
| 6,961,806 B1 | 11/2005 | Agesen et al. |
| 6,961,941 B1 | 11/2005 | Nelson et al. |
| 6,975,587 B1 | 12/2005 | Adamski et al. |
| 6,975,639 B1 | 12/2005 | Hill et al. |
| 7,039,720 B2 | 5/2006 | Alfieri et al. |
| 7,058,010 B2 | 6/2006 | Chidambaran et al. |
| 7,061,858 B1 | 6/2006 | Di Benedetto et al. |
| 7,065,059 B1 | 6/2006 | Zinin |
| 7,065,079 B1 | 6/2006 | Patra et al. |
| 7,080,283 B1 | 7/2006 | Songer et al. |
| 7,093,160 B2 | 8/2006 | Lau et al. |
| 7,133,399 B1 | 11/2006 | Brewer et al. |
| 7,188,237 B2 | 3/2007 | Zhou et al. |
| 7,194,652 B2 | 3/2007 | Zhou et al. |
| 7,236,453 B2 | 6/2007 | Visser et al. |
| 7,269,133 B2 | 9/2007 | Lu et al. |
| 7,284,236 B2 | 10/2007 | Zhou et al. |
| 7,292,535 B2 | 11/2007 | Folkes et al. |
| 7,305,492 B2 | 12/2007 | Bryers et al. |
| 7,308,503 B2 | 12/2007 | Giraud et al. |
| 7,315,552 B2 | 1/2008 | Kalkunte et al. |
| 7,317,722 B2 | 1/2008 | Aquino et al. |
| 7,324,500 B1 | 1/2008 | Blackmon et al. |
| 7,327,671 B2 | 2/2008 | Karino et al. |
| 7,339,903 B2 | 3/2008 | O'Neill |
| 7,360,084 B1 | 4/2008 | Hardjono |
| 7,362,700 B2 | 4/2008 | Frick et al. |
| 7,382,736 B2 | 6/2008 | Mitchem et al. |
| 7,385,977 B2 | 6/2008 | Wu et al. |
| 7,392,424 B2 | 6/2008 | Ho et al. |
| 7,404,006 B1 | 7/2008 | Slaughter et al. |
| 7,406,037 B2 | 7/2008 | Okita |
| 7,417,947 B1 | 8/2008 | Marques et al. |
| 7,417,990 B2 | 8/2008 | Ikeda et al. |
| 7,418,439 B2 | 8/2008 | Wong |
| 7,424,014 B2 | 9/2008 | Mattes et al. |
| 7,441,017 B2 | 10/2008 | Watson et al. |
| 7,444,422 B1 | 10/2008 | Li |
| 7,447,225 B2 | 11/2008 | Windisch et al. |
| 7,483,370 B1 | 1/2009 | Dayal et al. |
| 7,483,433 B2 | 1/2009 | Simmons et al. |
| 7,503,039 B2 * | 3/2009 | Inoue et al. .................... 717/154 |
| 7,518,986 B1 | 4/2009 | Chadalavada et al. |
| 7,522,521 B2 | 4/2009 | Bettink et al. |
| 7,533,254 B2 | 5/2009 | Dybsetter et al. |
| 7,535,826 B1 | 5/2009 | Cole et al. |
| 7,599,284 B1 | 10/2009 | Di Benedetto et al. |
| 7,609,617 B2 | 10/2009 | Appanna et al. |
| 7,613,183 B1 | 11/2009 | Brewer et al. |
| 7,620,953 B1 * | 11/2009 | Tene et al. .................... 718/104 |
| 7,652,982 B1 | 1/2010 | Kovummal |
| 7,656,409 B2 * | 2/2010 | Cool et al. .................... 345/501 |
| 7,664,020 B2 | 2/2010 | Luss |
| 7,720,066 B2 | 5/2010 | Weyman et al. |
| 7,729,296 B1 | 6/2010 | Choudhary |
| 7,739,360 B2 | 6/2010 | Watson et al. |
| 7,751,311 B2 | 7/2010 | Ramaiah et al. |
| 7,787,360 B2 | 8/2010 | Windisch et al. |
| 7,787,365 B1 | 8/2010 | Marques et al. |
| 7,788,381 B2 | 8/2010 | Watson et al. |
| 7,802,073 B1 * | 9/2010 | Cheng et al. .................... 712/10 |
| 7,804,769 B1 | 9/2010 | Tuplur et al. |
| 7,804,770 B2 | 9/2010 | Ng |
| 7,805,516 B2 * | 9/2010 | Kettler et al. .................. 709/226 |
| 7,830,802 B2 | 11/2010 | Huang et al. |
| 7,830,895 B2 * | 11/2010 | Endo et al. .................... 370/401 |
| 7,843,920 B2 | 11/2010 | Karino et al. |
| 7,843,930 B2 | 11/2010 | Mattes et al. |
| 7,873,776 B2 * | 1/2011 | Hetherington et al. ............ 711/5 |
| 7,886,195 B2 | 2/2011 | Mayer |
| 7,894,334 B2 | 2/2011 | Wen et al. |
| 7,929,424 B2 | 4/2011 | Kochhar et al. |
| 7,940,650 B1 | 5/2011 | Sandhir et al. |
| 7,944,811 B2 | 5/2011 | Windisch et al. |
| 7,974,315 B2 | 7/2011 | Yan et al. |
| 8,009,671 B2 | 8/2011 | Guo et al. |
| 8,014,394 B2 | 9/2011 | Ram |
| 8,028,290 B2 * | 9/2011 | Rymarczyk et al. ........... 718/104 |
| 8,040,884 B2 | 10/2011 | Arunachalam et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 | 1/2012 | Rao |
| 8,121,025 B2 | 2/2012 | Duan et al. |
| 8,131,833 B2 | 3/2012 | Hadas et al. |
| 8,149,691 B1 | 4/2012 | Chadalavada et al. |

(56) References Cited

U.S. PATENT DOCUMENTS

| | | | |
|---|---|---|---|
| 8,156,230 B2 | 4/2012 | Bakke et al. | |
| 8,161,260 B2 | 4/2012 | Srinivasan | |
| 8,180,923 B2 * | 5/2012 | Smith et al. | 709/250 |
| 8,181,174 B2 * | 5/2012 | Liu | 718/1 |
| 8,289,912 B2 | 10/2012 | Huang | |
| 8,291,430 B2 | 10/2012 | Anand et al. | |
| 8,335,219 B2 | 12/2012 | Simmons et al. | |
| 8,341,625 B2 * | 12/2012 | Ferris et al. | 718/1 |
| 8,345,536 B1 | 1/2013 | Rao et al. | |
| 8,406,125 B2 | 3/2013 | Dholakia et al. | |
| 8,495,418 B2 | 7/2013 | Abraham et al. | |
| 8,503,289 B2 | 8/2013 | Dholakia et al. | |
| 8,576,703 B2 | 11/2013 | Dholakia et al. | |
| 8,599,754 B2 | 12/2013 | Li | |
| 8,607,110 B1 | 12/2013 | Peng et al. | |
| 8,769,155 B2 | 7/2014 | Nagappan et al. | |
| 8,776,050 B2 | 7/2014 | Plouffe et al. | |
| 9,094,221 B2 | 7/2015 | Dholakia et al. | |
| 9,104,619 B2 | 8/2015 | Chin et al. | |
| 9,137,671 B2 | 9/2015 | Fahldieck | |
| 2002/0002640 A1 | 1/2002 | Barry | |
| 2002/0013802 A1 | 1/2002 | Mori et al. | |
| 2002/0103921 A1 | 8/2002 | Nair et al. | |
| 2002/0150094 A1 | 10/2002 | Cheng et al. | |
| 2003/0084161 A1 | 5/2003 | Watson et al. | |
| 2003/0105794 A1 | 6/2003 | Jasinschi et al. | |
| 2003/0202520 A1 | 10/2003 | Witkowski et al. | |
| 2004/0001485 A1 | 1/2004 | Frick et al. | |
| 2004/0030766 A1 | 2/2004 | Witkowski | |
| 2004/0078625 A1 | 4/2004 | Rampuria et al. | |
| 2005/0028028 A1 | 2/2005 | Jibbe | |
| 2005/0036485 A1 | 2/2005 | Eilers et al. | |
| 2005/0055598 A1 | 3/2005 | Chen et al. | |
| 2005/0114846 A1 | 5/2005 | Banks et al. | |
| 2005/0149633 A1 | 7/2005 | Natarajan et al. | |
| 2005/0213498 A1 | 9/2005 | Appanna et al. | |
| 2006/0002343 A1 | 1/2006 | Nain et al. | |
| 2006/0004942 A1 | 1/2006 | Hetherington et al. | |
| 2006/0018253 A1 | 1/2006 | Windisch et al. | |
| 2006/0018333 A1 | 1/2006 | Windisch et al. | |
| 2006/0090136 A1 | 4/2006 | Miller et al. | |
| 2006/0143617 A1 | 6/2006 | Knauerhase et al. | |
| 2006/0171404 A1 | 8/2006 | Nalawade et al. | |
| 2006/0176804 A1 | 8/2006 | Shibata | |
| 2006/0184349 A1 | 8/2006 | Goud et al. | |
| 2006/0184938 A1 | 8/2006 | Mangold | |
| 2006/0224826 A1 | 10/2006 | Arai et al. | |
| 2006/0274649 A1 | 12/2006 | Scholl | |
| 2006/0294211 A1 | 12/2006 | Amato | |
| 2007/0027976 A1 | 2/2007 | Sasame et al. | |
| 2007/0036178 A1 | 2/2007 | Hares et al. | |
| 2007/0076594 A1 | 4/2007 | Khan et al. | |
| 2007/0162565 A1 | 7/2007 | Hanselmann | |
| 2007/0169084 A1 | 7/2007 | Frank et al. | |
| 2007/0174309 A1 | 7/2007 | Pettovello | |
| 2007/0189213 A1 | 8/2007 | Karino et al. | |
| 2008/0022410 A1 | 1/2008 | Diehl | |
| 2008/0068986 A1 | 3/2008 | Maranhao et al. | |
| 2008/0082810 A1 | 4/2008 | Cepulis et al. | |
| 2008/0120518 A1 | 5/2008 | Ritz et al. | |
| 2008/0159325 A1 | 7/2008 | Chen et al. | |
| 2008/0165681 A1 | 7/2008 | Huang et al. | |
| 2008/0165750 A1 | 7/2008 | Kim | |
| 2008/0189468 A1 | 8/2008 | Schmidt et al. | |
| 2008/0201603 A1 | 8/2008 | Ritz et al. | |
| 2008/0212584 A1 | 9/2008 | Breslau et al. | |
| 2008/0222633 A1 | 9/2008 | Kami | |
| 2008/0243773 A1 | 10/2008 | Patel et al. | |
| 2008/0244222 A1 * | 10/2008 | Supalov et al. | 712/13 |
| 2008/0250266 A1 | 10/2008 | Desai et al. | |
| 2009/0028044 A1 | 1/2009 | Windisch et al. | |
| 2009/0031166 A1 | 1/2009 | Kathail et al. | |
| 2009/0036152 A1 | 2/2009 | Janneteau et al. | |
| 2009/0037585 A1 | 2/2009 | Miloushev et al. | |
| 2009/0049537 A1 | 2/2009 | Chen et al. | |
| 2009/0051492 A1 | 2/2009 | Diaz et al. | |
| 2009/0054045 A1 | 2/2009 | Zakrzewski et al. | |
| 2009/0080428 A1 | 3/2009 | Witkowski et al. | |
| 2009/0086622 A1 | 4/2009 | Ng | |
| 2009/0092135 A1 | 4/2009 | Simmons et al. | |
| 2009/0094481 A1 * | 4/2009 | Vera et al. | 714/11 |
| 2009/0106409 A1 | 4/2009 | Murata | |
| 2009/0144579 A1 | 6/2009 | Swanson | |
| 2009/0185506 A1 | 7/2009 | Watson et al. | |
| 2009/0198766 A1 | 8/2009 | Chen et al. | |
| 2009/0216863 A1 | 8/2009 | Gebhart et al. | |
| 2009/0219807 A1 | 9/2009 | Wang | |
| 2009/0245248 A1 | 10/2009 | Arberg et al. | |
| 2009/0316573 A1 | 12/2009 | Lai | |
| 2010/0017643 A1 | 1/2010 | Baba et al. | |
| 2010/0039932 A1 | 2/2010 | Wen et al. | |
| 2010/0058342 A1 | 3/2010 | Machida | |
| 2010/0064293 A1 | 3/2010 | Kang et al. | |
| 2010/0107162 A1 | 4/2010 | Edwards et al. | |
| 2010/0138208 A1 | 6/2010 | Hattori et al. | |
| 2010/0138830 A1 * | 6/2010 | Astete et al. | 718/1 |
| 2010/0169253 A1 | 7/2010 | Tan | |
| 2010/0235662 A1 | 9/2010 | Nishtala | |
| 2010/0257269 A1 | 10/2010 | Clark | |
| 2010/0278091 A1 | 11/2010 | Sung et al. | |
| 2010/0287548 A1 | 11/2010 | Zhou et al. | |
| 2010/0325381 A1 * | 12/2010 | Heim | 711/170 |
| 2010/0325485 A1 * | 12/2010 | Kamath | G06F 11/2097 714/15 |
| 2011/0010709 A1 * | 1/2011 | Anand et al. | 718/1 |
| 2011/0023028 A1 | 1/2011 | Nandagopal et al. | |
| 2011/0029969 A1 * | 2/2011 | Venkataraja | G06F 9/5077 718/1 |
| 2011/0072327 A1 | 3/2011 | Schoppmeier et al. | |
| 2011/0125949 A1 | 5/2011 | Mudigonda et al. | |
| 2011/0154331 A1 | 6/2011 | Ciano et al. | |
| 2011/0173334 A1 | 7/2011 | Shah | |
| 2011/0228770 A1 | 9/2011 | Dholakia et al. | |
| 2011/0228771 A1 | 9/2011 | Dholakia et al. | |
| 2011/0228772 A1 | 9/2011 | Dholakia et al. | |
| 2011/0228773 A1 | 9/2011 | Dholakia et al. | |
| 2011/0231578 A1 | 9/2011 | Nagappan et al. | |
| 2012/0023319 A1 | 1/2012 | Chin et al. | |
| 2012/0030237 A1 | 2/2012 | Tanaka | |
| 2012/0158995 A1 | 6/2012 | McNamee et al. | |
| 2012/0174097 A1 | 7/2012 | Levin | |
| 2012/0230240 A1 | 9/2012 | Nebat et al. | |
| 2012/0290869 A1 | 11/2012 | Heitz | |
| 2013/0070766 A1 | 3/2013 | Pudiyapura | |
| 2013/0211552 A1 | 8/2013 | Gomez et al. | |
| 2013/0259039 A1 | 10/2013 | Dholakia et al. | |
| 2014/0007097 A1 | 1/2014 | Chin et al. | |
| 2014/0029613 A1 | 1/2014 | Dholakia et al. | |
| 2014/0036915 A1 | 2/2014 | Dholakia et al. | |
| 2014/0068103 A1 | 3/2014 | Gyambavantha et al. | |
| 2014/0089425 A1 | 3/2014 | Chin et al. | |
| 2014/0089484 A1 | 3/2014 | Chin et al. | |
| 2014/0095927 A1 | 4/2014 | Abraham et al. | |

FOREIGN PATENT DOCUMENTS

| | | | |
|---|---|---|---|
| EP | 1107511 A2 | | 6/2001 |
| EP | 1939742 A2 * | | 7/2008 |
| EP | 2084605 A2 | | 8/2009 |
| WO | WO 2008/054997 A2 | | 5/2008 |
| WO | WO 2014/004312 A1 | | 1/2014 |

OTHER PUBLICATIONS

Hemminger, "Delivering Advanced Application Acceleration & Security," Application Delivery Challenge, Jul. 2007, pp. 1-3.

Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri. . . .

Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0 . . . .

(56) References Cited

OTHER PUBLICATIONS

Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0 . . . .
Schlansker, et al., "High-Performance Ethernet-Based Communications for Future Multi-Core Processors," SC07 Nov. 10-16, 2007, 12 pages, Copyright 2007, ACM.
U.S. Appl. No. 09/703,057, filed Oct. 31, 2000, Brewer et al.
Braden et al., "Integrated Services in the Internet Architecture: an Overview," Jul. 1994, RFC 1633, Network Working Group, pp. 1-28.
Chen, "New Paradigm in Application Delivery Networking: Advanced Core Operating System (ACOS) and Multi-CPU Architecture—The Key to Achieving Availability, Scalability and Performance." White Paper, May 2009, A10 Networks, 5 pages.
Demers et al., "Analysis and Simulation of a Fair Queuing Algorithm," Xerox PARC, Copyright 1989, ACM, pp. 1-12.
Extreme v. Enterasys WI Legal Transcript of Stephen R. Haddock, May 7, 2008, vol. 2, 2 pages.
Floyd et al., "Link-sharing and Resource Management Models for Packet Networks," IEEE/ACM Transactions on Networking, Aug. 1995, vol. 3, No. 4, Copyright 1995, IEEE, pp. 1-22.
Freescale Semiconductor, Inc., "Freescale's Embedded Hypervisor for QorIQ™ P4 Series Communications Platform," White Paper, Oct. 2008, Copyright 2008, Document No. EMHYPQIQTP4CPWP, Rev. 1, pp. 1-8.
Freescale Semiconductor, Inc., "Embedded Multicore: An Introduction," Jul. 2009, Copyright 2009, Document No. EMBMCRM, Rev. 0, 73 pages.
"GIGAswitch FDDI System—Managers Guide," Part No. EK-GGMGA-MG.B01, Jun. 1993 first printing, Apr. 1995 second printing, Copyright 1995, Digital Equipment Corporation, Maynard, MA, 113 pages.
"GIGAswitch System—Managers Guide," Part No. EK-GGMGA-MG.A01, Jun. 1993, Copyright 1993, Digital Equipment Corporation, Maynard, MA, 237 pages.
Keshav, "An Engineering Approach to Computer Networking: ATM Networks; the internet, and the Telephone Network," Addison-Wesley Professional Computing Series, part 1 of 5, May 15, 1997, Copyright 1997 by AT&T, Addison-Wesley Publishing Company, pp. 1-129.
Keshav, "An Engineering Approach to Computer Networking: ATM Networks; the internet, and the Telephone Network," Addison-Wesley Professional Computing Series, part 2 of 5, May 15, 1997, Copyright 1997 by AT&T, Addison-Wesley Publishing Company, pp. 130-260.
Keshav, "An Engineering Approach to Computer Networking: ATM Networks; the internet, and the Telephone Network," Addison-Wesley Professional Computing Series, part 3 of 5, May 15, 1997, Copyright 1997 by AT&T, Addison-Wesley Publishing Company, pp. 261-389.
Keshav, "An Engineering Approach to Computer Networking: ATM Networks; the internet, and the Telephone Network," Addison-Wesley Professional Computing Series, part 4 of 5, May 15, 1997, Copyright 1997 by AT&T, Addison-Wesley Publishing Company, pp. 390-519.
Keshav, "An Engineering Approach to Computer Networking: ATM Networks; the internet, and the Telephone Network," Addison-Wesley Professional Computing Series, part 5 of 5, May 15, 1997, Copyright 1997 by AT&T, Addison-Wesley Publishing Company, pp. 520-660.
May, et al., "An Experimental Implementation of Traffic Control for IP Networks," 1993, Sophia-Antipolis Cedex, France, 11 pages.
Partridge, "A Proposed Flow Specification," Sep. 1992, RFC 1363, Network Working Group, pp. 1-20.
TCP/IP Illustrated, vol. 2: The Implementation, Gray R. Wright and W. Richard Stevens, Addison-Wesley 1995, pp. 64, 97, 128, 158, 186, 207, 248, 277, 305, 340, 383, 398, 437, 476, 572, 680, 715, 756, 797, 1028, and 1051.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, pp. 404-409.
Non-Final Office Action for U.S. Appl. No. 09/896,228, mailed on Jul. 29, 2005, 17 pages.
Non-Final Office Action for U.S. Appl. No. 09/896,228, mailed on Sep. 7, 2006, 17 pages.
Non-Final Office Action for U.S. Appl. No. 09/896,228, mailed on Mar. 5, 2007, 14 pages.
Final Office Action for U.S. Appl. No. 09/896,228, mailed Aug. 21, 2007, 15 pages.
Notice of Allowance for U.S. Appl. No. 09/896,228, mailed on Jun. 17, 2008, 20 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/953,714, mailed on Jan. 26, 2006, 15 pages.
Final Office Action for U.S. Appl. No. 09/953,714, mailed on Aug. 17, 2006, 17 pages.
Notice of Allowance for U.S. Appl. No. 09/953,714, mailed on Sep. 14, 2009, 6 pages.
Notice of Allowance for U.S. Appl. No. 09/953,714, mailed on Feb. 5, 2010, 10 pages.
Non-Final Office Action for U.S. Appl. No. 12/210,957, mailed on Sep. 2, 2009, 16 pages.
Notice of Allowance for U.S. Appl. No. 12/210,957, mailed on Feb. 4, 2010, 10 pages.
Order Granting/Denying Request for Ex Parte Reexamination for U.S. Appl. No. 90/010,432, mailed on May 21, 2009, 18 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,434, mailed on May 22, 2009, 20 pages.
European Search Report for Application No. EP 02254403, dated Mar. 18, 2003, 3 pages.
European Search Report for Application No. EP 02256444, dated Feb. 23, 2005, 3 pages.
Non-Final Office Action for U.S. Appl. No. 12/333,029, mailed on Mar. 30, 2012, 15 pages.
Non-Final Office Action for U.S. Appl. No. 12/913,572 mailed on Aug. 3, 2012, 6 pages.
Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 7 pages.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Cisco Systems, Inc., "BGP Support for Nonstop Routing (NSR) with Stateful Switchover (SSO)." Mar. 20, 2006, pp. 1-18.
Cisco Systems, Inc., "Graceful Restart, Non Stop Routing and IGP routing protocol timer Manipulation," Copyright Jun. 2008, pp. 1-4.
Cisco Systems, Inc., "Intermediate System-to-Intermediate System (IS-IS) Support for Graceful Restart (GR) and Non-Stop Routing (NSR)," Copyright 2008, pp. 1-3.
Cisco Systems, Inc., "Internet Protocol Multicast," Internetworking Technologies Handbook, 3rd Edition, Chapter 43, pp. 43-1 through 43-16.
Cisco Systems, Inc., "Multicast Quick—Start Configuration Guide," Document ID:9356, Copyright 2008-2009, 15 pages.
Cisco Systems, Inc., "Warm Reload," Cisco IOS Releases 12.3(2)T, 12.2(18)S, and 12.2(27)SBC, Copyright 2003, pp. 1-14.

(56) References Cited

OTHER PUBLICATIONS

Fenner, et al., "Protocol Independent Multicast—Sparse Mode (PIM-SM): Protocol Specification (Revised)." Network Working Group, RFC 4601, Aug. 2006, pp. 1-151.
Hardwick, "IP Multicast Explained," Metaswitch Networks, Jun. 2004, pp. 1-68.
IP Infusion Brochure, "ZebOS® Network Platform: Transporting You to Next Generation Networks," ip infusion ™ An ACCESS Company, Jun. 2008, pp. 1-6.
Kakadia, et al., "Enterprise Network Design Patterns: High Availability" Sun Microsystems, Inc., Sun BluePrints™Online, Revision A, Nov. 26, 2003, pp. 1-35, at sun.com/blueprints.
Kaplan, "Part 3 in the Reliability Series: NSR™ Non-Stop Routing Technology," White Paper, Avici Systems, Copyright 2002, pp. 1-8.
Khan, "IP Routing Use Cases," Cisco Press, Sep. 22, 2009, pp. 1-16, at URL:ciscopress.com/articles/printerfriendly.asp?p=1395746.
Lee, et al., "Open Shortest Path First (OSPF) Conformance and Performance Testing," White Papers, Ixia—Leader in Convergence IP Testing, Copyright 1998-2004, pp. 1-17.
Manolov, et al., "An Investigation into Multicasting, Proceedings of the 14th Annual Workshop on Architecture and System Design," (ProRISC2003), Veldhoven, The Netherlands, Nov. 2003, pp. 523-528.
Pepelnjak, et al., "Using Multicast Domains," informIT, Jun. 27, 2003, pp. 1-29, at URL:informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, pp. 1-11.
Rodbell, "Protocol Independent Multicast—Sparse Mode," CommsDesign, Dec. 19, 2009, pp. 1-5, at commsdesign.com/main/9811/9811standards.htm.
U.S. Appl. No. 12/823,073, filed Jun. 24, 2010, Nagappan et al.
U.S. Appl. No. 12/913,572, filed Oct. 27, 2010, Dholakia et al.
U.S. Appl. No. 12/913,598, filed Oct. 27, 2010, Dholakia et al.
U.S. Appl. No. 12/913,612, filed Oct. 27, 2010, Dholakia et al.
U.S. Appl. No. 12/913,650, filed Oct. 27, 2010, Dholakia et al.
Cisco IP Routing Handbook, Copyright 2000, pp. 22-23, 119-135, and 405-406, M&T Books.
Kaashok et al., "An Efficient Reliable Broadcast Protocol, " Operating System Review, Oct. 4, 1989, 15 pages.
Moy, "OSPF Version 2," Network Working Group, RFC 2328, Apr. 1998, 204 pages.
Non-Final Office Action for U.S. Appl. No. 12/333,029, mailed on May 27, 2010, 29 pages.
Intel ® Virtualization Technology, Product Brief, "Virtualization 2.0—Moving Beyond Consolidation", 2008, 4 pages.
Vmware., "Automating High Availability (HA) Services With VMware HA", Vmware Infrastructure, Copyright ®1998-2006, 15 pages.
Vmware, "Resource Management with Vmware DRS", VMware Infrastructure, Copyright ® 1998-2006, 24 pages.
Vmware, "Dynamic Balancing and Allocation of Resources for Virtual Machines", Product Datasheet, Copyright ® 1998-2006, 2 pages.
Quickspecs, "HP Online VM Migration (for HP Integrity Virtual Machines)", Wordwide—Version 4, Sep. 27, 2010,4 pages.
Vmware, "Live Migration for Virtual Machines Without Service Interruption", Product Datasheet, Copyright ® 2009 Vmware, Inc., 4 pages.
Burke, "Vmware Counters Oracle, Microsoft With Free Update", Nov. 13, 2007, 2 pages.
Final Office Action for U.S. Appl. No. 12/823,073 mailed on Jan. 23, 2013, 23 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.
U.S. Appl. No. 13/925,696, filed Jun. 24, 2013 by Abraham et al. Unpublished.
U.S. Appl. No. 13/925,723, filed Jun. 24, 2013 by Dholakia et al. Unpublished.
Non-Final Office Action for U.S. Appl. No. 12/842,945 mailed on Jun. 20, 2013, 14 pages.
Notice of Allowance for U.S. Appl. No. 12/913,598 mailed on Jul. 9, 2013, 6 pages.
Notification of Transmittal of the International Search Report and the Written Opinion of the International Searching Authority, or The Declaration; International Search Report and Written Opinion of the International Searching Authority for International Application No. PCT/US2013/047105 mailed on Oct. 29, 2013, 8 pages.
U.S. Appl. No. 14/514,253, filed Zhou et al. on Oct. 14, 2014. Unpublished.
Notice of Allowance for U.S. Appl. No. 12/823,073 mailed on Feb. 19, 2014, 8 pages.
Final Office Action for U.S. Appl. No. 12/842,945 mailed on Mar. 7, 2014, 13 pages.
Non-Final Office Action for U.S. Appl. No. 13/925,696 mailed on Aug. 27, 2014, 8 pages.
Non-Final Office Action for U.S. Appl. No. 13/796,136 mailed on Sep. 8, 2014, 19 pages.
Non-Final Office Action for U.S. Appl. No. 12/842,945 mailed on Sep. 17, 2014, 7 pages.
Non-Final Office Action for U.S. Appl. No. 13/827,641 mailed on Feb. 18, 2015, 8 pages.
Non-Final Office Action for U.S. Appl. No. 13/621,138 mailed on Aug. 22, 2014, 7 pages.
Notice of Allowance for U.S. Appl. No. 13/621,138 mailed on May 11, 2015, 6 pages.
Non-Final Office Action for U.S. Appl. No. 14/050,263 mailed on Apr. 23, 2015, 5 pages.
Notice of Allowance for U.S. Appl. No. 12/842,945, mailed on Apr. 8, 2015, 9 pages.
Notice of Allowance for U.S. Appl. No. 13/621,138, mailed on Jul. 17, 2015, 5 pages.
Notice of Allowance, mailed on Aug. 18, 2015, for U.S. Appl. No. 13/827,641, filed Mar. 14, 2013, 8 pages.
Ex Parte Quayle Action, mailed Sep. 1, 2015, for U.S. Appl. No. 13/770,751, filed Feb. 19, 2013, 8 pages.
Notice of Allowance for U.S. Appl. No. 13/925,696 mailed on Jan. 7, 2015, 6 pages.
Non-Final Office Action for U.S. Appl. No. 13/770,751 mailed on Feb. 24, 2015, 10 pages.
Notice of Allowance for U.S. Appl. No. 13/925,723 mailed on Mar. 17, 2015, 5 pages.
Non-Final Office Action for U.S. Appl. No. 13/840,540 mailed on Mar. 23, 2015, 14 pages.
Final Office Action for U.S. Appl. No. 13/796,136 mailed on Mar. 27, 2015, 17 pages.
U.S. Appl. No. 14/923,327, filed Oct. 26, 2015, by Bill Ying Chin (Unpublished.).
Final Office Action for U.S. Appl. No. 14/050,263 mailed on Oct. 7, 2015, 9 pages.
Notice of Allowance for U.S. Appl. No. 13/770,751, mailed on Nov. 16, 2015, 29 pages.
Non-Final Office Action for U.S. Appl. No. 13/796,136, mailed on Dec. 9, 2015, 16 pages.

* cited by examiner

CORE-TRUNKING ACROSS CORES ON PHYSICALLY SEPARATED PROCESSORS ALLOCATED TO A VIRTUAL MACHINE BASED ON CONFIGURATION INFORMATION INCLUDING CONTEXT INFORMATION FOR VIRTUAL MACHINES

BACKGROUND

The present application relates to virtualization and more particularly to core-based virtualization.

Virtualization implies that one or more virtual machines may be configured for a network device. The virtual machines enable the network device to act like multiple virtual network devices. However, the creation and management of virtual machines can get quite complicated, since resources of the network device must be manual partitioned between the virtual machines. For example, configuring virtual machines typically required complicated tweaking and partitioning of processor-related or memory-related resources.

BRIEF SUMMARY

Embodiments of the present invention provide virtualization based upon cores (core-based virtualization) provided by one or more processors of a system. A device such as a network device comprising multiple processor cores provides for core-based virtualization.

According to an embodiment of the present invention, a network device is provided comprising a first subsystem for processing packets received by the network device. The first subsystem may comprise a set of one or more processors, the one or more processors providing a plurality of cores. Each core in the plurality of cores may have associated memory resources. The cores provide the basis for core-based virtualization.

In one embodiment, the network device may store configuration information for a set of virtual machines configured for the network device. For each virtual machine in the set of virtual machines, the configuration information may comprise information identifying a set of one or more cores allocated to the virtual machine from the plurality of cores. Further, for each virtual machine in the set of virtual machines, the memory resources associated with the set of cores allocated to the virtual machine are automatically allocated for the virtual machine.

In one embodiment, when a packet is received by the network device, a second subsystem of the network device may cause the packet to be forwarded to a first core from a set of cores allocated to a first virtual machine from the set of virtual machines configured for the network device. In one embodiment, contents from the packet may be extracted and the first core determined based upon the extracted contents of the packet.

Various techniques may be used to determine the first core to which the packet is to be forwarded. In one embodiment, one or more lookups (e.g., CAM or table lookups) may be performed using the extracted packet contents to determine the first core.

In one embodiment, the network device may further comprise a switch fabric. After the first core has been determined based upon the extracted contents, the packet may be forwarded to the switch fabric. The switch fabric may then forward the packet to the first core from the set of cores allocated for the first virtual machine. In one embodiment, the packet is written to the memory resource associated with the first core.

In one embodiment, the network device may be configured to determine the first virtual machine from the set of virtual machines, determine the set of cores allocated to the first virtual machine, and determine the first core from the set of cores allocated to the first virtual machine. The packet may then be forwarded to the selected core for processing.

Techniques are provided for configuring virtual machines for a network device. In one embodiment, a network device may receive a request to configure a virtual machine based upon a set of cores provided by a set of processors of the network device. The network device may also receive information identifying one or more cores from the set of cores to be allocated for the virtual machine to be configured. The network device may then configure a virtual machine wherein the identified one or more cores and associated memory resources are allocated to the virtual machine. Information related to the virtual machine that is configured may be stored in a memory of the network device.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the embodiments of the invention may be practiced without these specific details.

Embodiments of the present invention provide virtualization based upon cores (core-based virtualization) provided by one or more processors in a system. In one embodiment, a device such as a network device comprising multiple processor cores provides for core-based virtualization.

Figure 1:
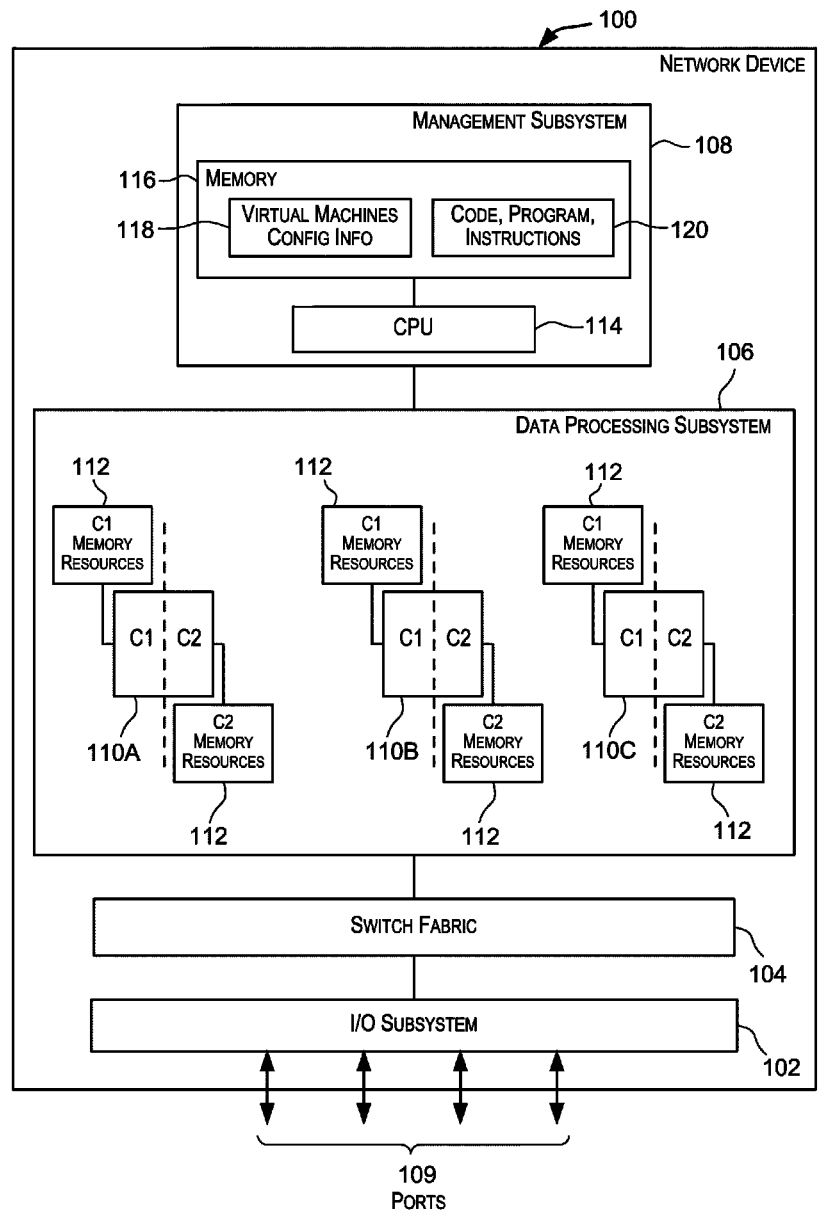
FIG. 1 is a simplified block diagram of a network device that may incorporate an embodiment of the present invention.

FIG. 1 is a simplified block diagram of a network device 100 that may incorporate an embodiment of the present invention. Network device 100 may be any device that is configured to receive and forward data. The data processing performed by network device 100 for forwarding data may include for example Layer 2-3 and/or Layer 4-7 processing. Examples of network device 100 include a switch, a router, an application delivery controller (ADC), or any other device that is configured to receive and forward data. For example, network device 100 may be a device provided by Brocade Communications Systems, Inc. FIG. 1 is merely illustrative of an embodiment of the present invention and is not intended to limit the scope of the invention as recited in the claims. Various variations and modifications are possible in alternative embodiments.

In the embodiment depicted in FIG. 1, network device 100 comprises multiple subsystems including an input/output (I/O) subsystem 102, a switch fabric 104, a data processing subsystem 106 and a management subsystem 108. Network device 100 supports virtualization based upon processor cores provided by data processing subsystem 106. As depicted in FIG. 1, data processing subsystem 106 comprises multiple processors 110A, 110B, and 110C (referred to generally as processors 110). Each processor 110 may support one core or multiple processor cores (referred to as "cores"). For example, in the embodiment depicted in FIG. 1, each of the processors 110A, 110B, and 110C supports two cores, i.e., each processor is a dual-core processor. In alternative embodiments, processors 110 in data processing subsystem 106 may support different numbers of cores. For example, in an alternative embodiment, the number of cores provided by processor 110A may be different from the number of cores provided by processor 110B. Accordingly, the number of processors included in a network device and the number of cores provided by each of the processors may vary in alternative embodiments.

Each core has its own associated memory resources 112 that may be used by the core for performing processing. In one embodiment, memory resources associated with one core cannot be used by another core. In other embodiments, the memory resources associated with one core may be used by another core. The memory resources 112 associated with a core may include one or more memories such as a content addressable memory (CAM), a RAM, and other memories. By providing an architecture in which each core has its own associated memory resources, allocation of a core also automatically allocates the memory resources associated with that core. In this manner, a user of network device 100 does not have to worry about partitioning and managing memory resources among the cores.

The cores in data processing subsystem 106 provide the basis for virtualization provided by network device 100. Virtualization implies that one or more virtual machines may be configured for network device 100. The virtual machines configured for network device 100 enable network device 100 to act like multiple virtual network devices. In one embodiment, one or more virtual machines for network device 100 may be configured based upon the cores provided by data processing subsystem 106, with each virtual machine being allocated one or more cores from the cores provided by network device 100. This is referred to as core-based virtualization.

Using core-based virtualization, network device 100 may be partitioned in multiple virtual machines based upon the cores provided by network device 100, with each virtual machine being aware of and using one or more cores allocated to that virtual machine and using memory resources associated with the cores allocated to that virtual machine. Each virtual machine may be configured such that it operates as a discrete virtual instance of network device 100. Consequently, as a result of virtualization, network device 100 may operate as several different discrete virtual network devices.

In one embodiment, a virtual machine may be configured for network device 100 by assigning a unique identifier (unique within network device 100) to the virtual machine and allocating a discrete number of one or more cores provided by data processing subsystem 106 to the virtual machine. Since each core has its own set of associated memory resources 112, by allocating a set of cores to a virtual machine, the memory resources associated with cores are also automatically allocated to that virtual machine. Accordingly, by providing an architecture in which each core has its associated memory resources, the allocation of both processing resources and memory resources for a virtual machine is automatically taken care of by simply allocating one or more cores to that virtual machine. This in turn simplifies the creation and management of virtual machines since manual partitioning of memory resources between the virtual machines, which can get quite complicated, does not have to be done. Core-based virtualization thus provides a clean and simple way for partitioning both processing resources and memory resources among virtual machines configured for network device 100. Configuring a virtual machine is done by simply allocating a discrete number of cores to the virtual machine. It does not require complicated tweaking and partitioning of processor-related or memory-related resources.

Grouping of cores for allocation to a virtual machine is sometimes referred to as core trunking. A core trunk may comprise a specified number of cores (e.g., 1, 2, 3, 4, 5, etc. cores). A core trunk may be allocated to a virtual machine.

As described above, one or more cores may be allocated to a virtual machine. The cores allocated to a virtual machine may include cores provided by the same processor or cores provided by different processors. For example, for the embodiment depicted in FIG. 1 comprising three dual-core processors, the virtual machines may be configured as follows:

VM1=cores C1 and C2 of processor 110A
VM2=core C1 of processor 110B
VM3=core C2 of processor 110B and cores C1 and C2 of processor 110C In the above example, virtual machine VM1 is allocated two cores from the same processor, virtual machine VM2 is allocated a single core from one processor, and virtual machine VM3 is allocated three cores from two different processors.

In one embodiment, a core allocated to one virtual machine cannot be allocated to another virtual machine. Further, a discrete number of cores need to be allocated for each virtual machine. As a result, the number of virtual machines that can be configured for a network device is dependent upon the total number of cores provided by the network device. For example, for the embodiment depicted in FIG. 1 providing six cores, a maximum of six virtual machines may be configured for network device 100, each virtual machine being allocated a single core.

Information related to virtual machines configured for network device 100 may be stored and managed by management subsystem 108 of network device 100. As depicted in FIG. 1, management subsystem 108 may comprise a CPU 114 and a memory 116. Memory 116 may store information 118 related to virtual machines configured for network device 100. For example, information 118 may comprise, for each virtual machine configured for network device 100, an identifier used for referencing the virtual machine and information identifying one or more cores allocated to the virtual machine.

In one embodiment, configuration information 118 may comprise multiple configuration files corresponding to the multiple virtual machines configured for network device 100. A configuration file created for a virtual machine and stored in memory 116 may identify a virtual machine and a set of one or more cores allocated to the virtual machine. The configuration information for a virtual machine may also include other information that defines a context for the virtual machine. The context information may identify the type of processing performed by the virtual machine, for example, the type of services provided by the virtual machine. The context information may also specify the type of data traffic to be forwarded to the virtual machine for processing, and other information.

In one embodiment, management subsystem 108 is configured to control and manage the various subsystems of network device 100. For example, management subsystem 108 may be configured to program I/O subsystem 102 based upon information 118 related to virtual machines that enables I/O subsystem 102 to determine particular virtual machines for processing packets received by network device 100 (as described below in further detail). Programs or code or instructions 120 that enable core-based virtualization related processing may be stored in memory 116 of management subsystem 108. These programs or code or instructions may be executed by CPU 114 of network device 100.

In the embodiment depicted in FIG. 1, configuration information 118 is stored within memory 116 of management subsystem 108. However, this is not intended to limit the scope of the invention embodiments recited in the claims. The configuration information may also be stored in other memories of network device 100 or in a memory location accessible to network device 100.

In one embodiment, network device 100 is configured to receive and forward data packets. In one embodiment, I/O subsystem 102 may comprise ports 109 via which data packets are received and forwarded by network device 100. A port may be classified as an input port or an output port depending upon whether a data packet is received or transmitted from network device 100 using the port. A port over which a data packet is received by network device 100 is referred to as an input port. A port used for communicating or forwarding a data packet from network device 100 is referred to as an output port. A particular port may function both as an input port and an output port. Ports 109 may be capable of receiving and/or transmitting different types of data traffic at different speeds including 1 Gigabit/sec, 10 Gigabits/sec, 40 Gigabits/sec, or more. In some embodiments, multiple ports of network device 100 may be logically grouped into one or more trunks.

Upon receiving a data packet via an input port, network device 100 is configured to perform processing to determine an output port for transmitting the data packet from the network device to facilitate transmission of the data packet to its intended destination. The data packet is then forwarded within network device 100 from the input port to the determined output port (or multiple output ports). The data packet is then forwarded from network device 100 using the output port.

In one embodiment, for a packet received by network device 100, I/O subsystem 102 is configured to analyze the packet to determine a processing entity within network device 100 for processing the packet. The processing entity may be a virtual machine from the set of virtual machines configured for network device 100 or CPU 114. In one embodiment, I/O subsystem 102 is configured to extract information (e.g., header information) from the data packet, analyze the extracted information, and determine a processing entity for the data packet. In one embodiment, I/O subsystem 102 may perform one or more memory lookups based upon the information extracted from the data packet to determine a processing entity for the packet, wherein the processing entity is a virtual machine from the set of virtual machines configured for the packet or CPU 114. For example, in one embodiment, CAM lookups may be performed using the extracted information to determine where the packet is to be forwarded for further processing.

In one embodiment, upon receipt of a packet, I/O subsystem 102 uses the configuration information stored for the various virtual machines configured for network device 100 to determine a virtual machine to which the packet is to be forwarded for processing. In one embodiment, this may be performed based upon the context information for the various virtual machines included in the virtual machines configuration information. For a determined virtual machine, the network device may also determine a set of one or more cores allocated to that virtual machine and select one or more cores from the set of cores to which the data packet is to be forwarded. In one embodiment, I/O subsystem 102 may perform one or more memory or table lookups to determine the one or more cores to which the packet is to be forwarded.

I/O subsystem 102 then causes the data packet to be communicated to the determined one or more cores. For instance, in the example provided above, I/O subsystem 102 may determine that a packet is to be processed by virtual machine VM3. I/O subsystem 102 may then determine that core C2 of processor 110B and cores C1 and C2 of processor 110C are allocated to VM3. I/O subsystem 102 may then select core C2 of processor 110B and cause the data packet to be communicated to core C2 of processor 110B.

In an alternative embodiment, the packet may be forwarded to multiple cores from the set of cores allocated to the virtual machine determined for packet processing. For example, for virtual machine VM3, the packet may be forwarded to core C2 of processor 110B and also to cores C1 and C2 of processor 110C for further processing.

In one embodiment, switch fabric 104 provides connectivity between data processing subsystem 106 and I/O subsystem 102. I/O subsystem 102 is configured to forward the data packet to switch fabric 104, which is then configured to communicate the packet to the cores determined for that packet by I/O subsystem 102. In one embodiment, switch fabric 104 communicates a packet to a selected core by writing the packet to the memory resource associated with the selected core. The selected core may then process the packet written to its memory resources.

After a packet has been communicated to a core, the core may perform further processing on the data packet. In one embodiment, a core may perform processing to determine an output port of network device 100 to be used for forwarding the packet from network device 100 to facilitate communication of the packet to its intended destination. A core may also perform other types of processing based upon the services to be provided by the core. Examples of services include security handling, web traffic management, VLAN processing, and the like.

After an output port has been determined for a packet, a core forwards the packet to switch fabric 104, which then communicates the packet to I/O subsystem 102. I/O subsystem 102 is then configured to transmit the packet from network device using the determined output port.

In exemplary network device 100 described above, by simply allocating one or more cores to a virtual machine, the memory resources associated with the allocated cores are automatically allocated to the virtual machine without needing any special processing or tweaking. The architecture of the network device including the manner in which memory resources are allocated to the cores enables core-based virtualization to be done in hardware.

Figure 2:
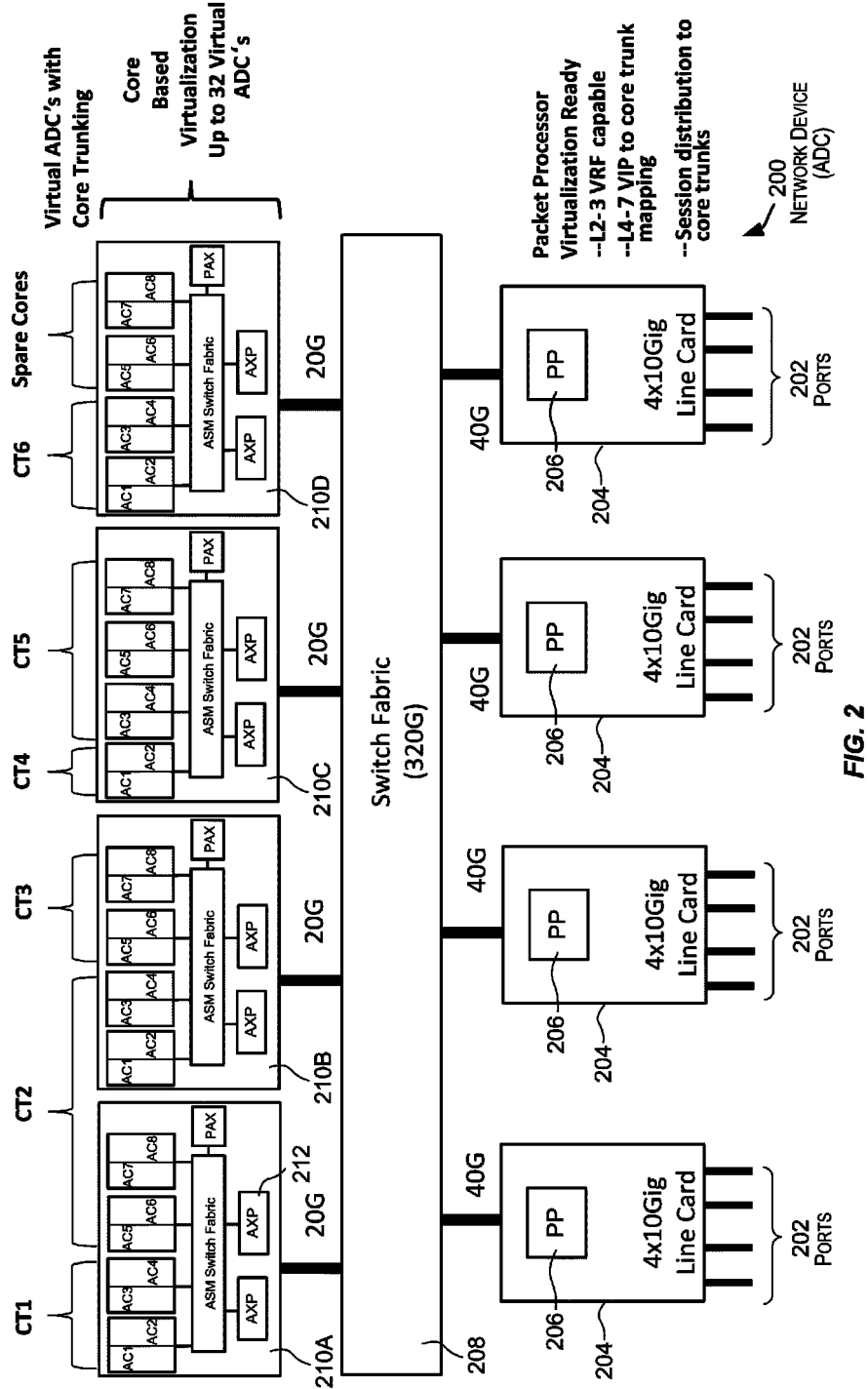
FIG. 2 is a simplified block diagram of a network device that may incorporate an embodiment of the present invention.

FIG. 2 is a simplified block diagram of a network device 200 that may incorporate an embodiment of the present invention. In one embodiment, network device 200 may be configured as an application delivery controller (ADC). For example, network device 200 may be an ADC provided by Brocade Communications Systems, Inc. An ADC such as ADC 200 depicted in FIG. 2 may be configured to perform various functions such as load balancing across a server farm, across firewalls, across intrusion prevention systems, and the like. For example, an ADC may be configured to offload data traffic to appropriate servers to ensure higher availability and security at extreme data rates, while lowering Total Cost of Ownership (TCO). An ADC may be provided in a chassis-based model and/or a stackable model. In one embodiment, ADC 200 includes hardware and software to enable core-based virtualization. The ADC embodiment depicted in FIG. 2 is merely an example and is not intended to limit the scope of embodiments of the present invention recited in the claims.

Network device (ADC) 200 may comprise one or more management cards (not shown) configured to perform management-related processing, one or more application switch modules 210 (ASMs) configured to perform data processing, a switch fabric 208, and one or more I/O cards 204. In the embodiment depicted in FIG. 2, network device 200 comprises four I/O cards 204 (also referred to as line cards). Each I/O line card is coupled to ports 202 and comprises a packet processor 206. An I/O card 204 is configured to perform I/O related operations. This may include receiving a packet via one or more ports 202, analyzing the packet to determine one or more processing entities (e.g., a virtual machine or to a CPU for software processing) to which the packet is to be forwarded for processing. As part of this processing, I/O card 204 is configured to, based upon information extracted from a data packet, determine a virtual machine to which the data packet is to be forwarded for processing and determine the one or more cores allocated to the determined virtual machine. I/O subsystem card 204 may then forward the data packet to switch fabric 208 for communication to one or more of the determined cores. An I/O card 204 may also receive packets from the cores via switch fabric 208 and forward the packets from network device 200 using the output ports determined from the processing performed by the cores. In one embodiment, the processing performed by I/O card 204 such as processing to determine a processing entity to which a packet is to be forwarded may be performed by packet processor (PP) 206 on the I/O card. In the embodiment depicted in FIG. 2, each I/O card 204 is a 4×10 G linecard.

Switch fabric 208 provides connectivity between I/O cards 204 and ASMs 210. Switch fabric 208 receives packets from I/O cards 204 and forwards the packets to appropriate ASMs 210. Switch fabric 208 receives packets from ASMs 210 and forwards the packets to appropriate I/O cards 204.

ASMs 210 represent the data processing subsystem in network device 200. Each ASM 210 may comprise multiple processors, with each processor providing one or more cores. In the embodiment depicted in FIG. 2, network device 200 comprises four ASM cards 210A, 210B, 210C, and 210D (referred to generally as ASM 210), each ASM comprising four dual-core processors. Accordingly, each ASM 210 provides eight cores (labeled AC1, AC2, AC3, AC4, AC5, AC6, AC7, and AC8 in FIG. 2) for a total of thirty-two cores for ADC 200. Accordingly, ADC 200 can support a maximum of 32 different virtual machines (virtual ADCs), each virtual ADC being aware of and using resources that are allocated to that virtual machine. In alternative embodiments, the processors on an ASM module may support more or less cores than those depicted in FIG. 2.

Core-based virtualization may be provided based upon the cores provided by ASMs 210. Core trunking across multiple ASMs may be provided. For example, in the example shown in FIG. 2, six virtual machines have been configured as follows:
(1) Virtual machine "CT1" with allocated cores AC1, AC2, AC3, AC4 provided by ASM 210A;
(2) Virtual machine "CT2" with allocated cores AC5, AC6, AC7, and AC8 provided by ASM 210A and cores AC1, AC2, AC3, and AC4 provided by ASM 210B;
(3) Virtual machine "CT3" with allocated cores AC5, AC6, AC7, and AC8 provided by ASM 210B;
(4) Virtual machine "CT4" with allocated cores AC1 and AC2 provided by ASM 210C;
(5) Virtual machine "CT5" with allocated cores AC3, AC4, AC5, AC6, AC7, and AC8 provided by ASM 210C; and
(6) Virtual machine "CT6" with allocated cores AC1, AC2, AC3, and AC4 provided by ASM 210D.
Cores AC5, AC6, AC7, and AC8 of ASM 210D have not yet been allocated to any virtual machine and are available for allocation.

As described above, ASM 210 may receive a packet from an I/O linecard 204 via switch fabric 208. The packet may be received by an AXP 212 on an ASM. AXP 212 may then forward the packet to the appropriate set of cores using an internal switch fabric. In the outgoing direction, packets processed by an ASM may be forwarded to one or more linecards 204 via switch fabric 208. The packets may then be forwarded from network device 200 using one or more output ports of the network device.

An ADC such as ADC 200 depicted in FIG. 2 may be configured to perform various functions such as load balancing across a server farm, across firewalls, across intrusion prevention systems, and the like. In one embodiment, ADC 200 may interface to multiple servers and perform load balancing across the servers. In one such embodiment, in the forward flow direction the ADC may receive data packets from a network and forward the packets to one or more of the servers. In the reverse flow direction, the ADC may receive packets from the servers and forward them over the network. During forward flow processing, an I/O subsystem of the ADC may receive a packet, determine a virtual machine to which the packet is to be forwarded, and then cause the packet to be forwarded to one or more cores corresponding to the determined virtual machine for processing. In one embodiment, the I/O subsystem may perform one or more memory or table lookups to determine the virtual machine to which the packet is to be forwarded. The memory or table lookups may also yield the cores corresponding to the virtual machine. The memory or table lookups may also yield one or more cores from the cores allocated to the virtual machine to which the packet is to be forwarded. After processing by the cores, the packet may be forwarded by the ADC to one or more servers from the multiple servers.

During reverse flow processing, the ADC may receive a packet from a server from the multiple servers. The I/O subsystem of the ADC may then determine a virtual machine to which the packet is to be forwarded, and forward the packet to one or more of the cores corresponding to the virtual machine. The packet may then be forwarded over the network.

Using core-based virtualization, a physical ADC, such as ADC 200 depicted in FIG. 2, may be configured to provide several virtual machines, each virtual machine acting as a virtual ADC instance and performing ADC-related processing. Each virtual ADC may provide the following capabilities (or a subset thereof): efficient server load balancing (SLB), intelligent application content inspection and switching; disaster recovery and Global Server Load Balancing (GSLB); robust application security shielding server farms and applications from wire-speed multi-Gigabit-rate DoS, DDos, virus, and worm attacks; support enterprise environments running IP- and Web-based applications; protect server farms against multiple forms of DoS attacks; high-availability application switching; HTTP multiplexing; application rate limiting; high-performance access control; application redirection; advanced firewall and security device load balancing; transparent cache switching; and other functions. Accordingly, each virtual machine created using core-based virtualization may function as a separate ADC.

Figure 3:
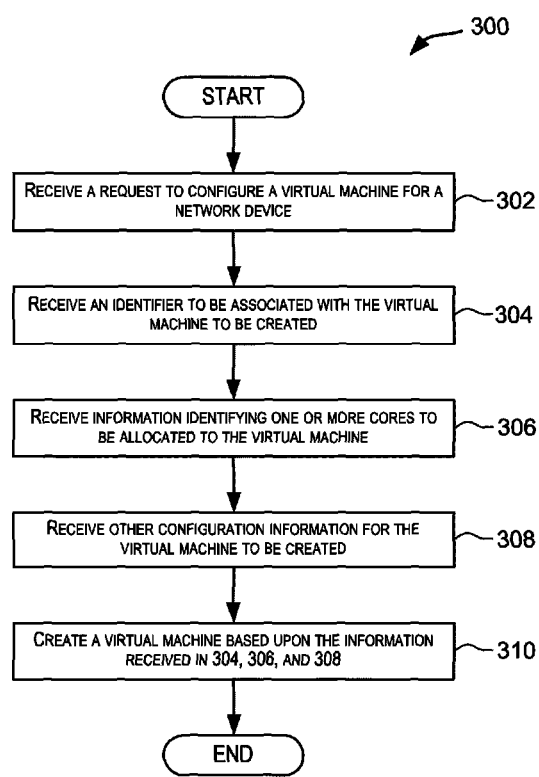
FIG. 3 depicts a high level simplified flowchart depicting a method performed by a network device for configuring a core-based virtual machine according to an embodiment of the present invention.

FIG. 3 depicts a high level simplified flowchart 300 depicting a method performed by a network device for configuring a core-based virtual machine according to an embodiment of the present invention. The processing depicted in flowchart 300 may be performed in software (e.g., instructions, code, program) executed by a processor, in hardware, or in combinations thereof. The software may be stored on a computer-readable storage medium. In one embodiment, the processing is performed by CPU 114 depicted in FIG. 1. The processing in FIG. 3 may be initiated by a user of the network device (e.g., a network administrator).

The processing in FIG. 3 may be initiated upon receiving a request to configure a virtual machine for a network device (step 302). The request may be received from various different sources. Information may be received identifying an identifier to be associated with the virtual machine to be created (step 304). The identifier may then be used to refer to the virtual machine (e.g., "VM1", "CT1" etc.). The identifier is typically unique within the network device. Information is received identifying one or more cores to be allocated to the virtual machine (step 306). In one embodiment, the information received in 304 may specifically identify the cores to be included in the virtual machine. For example, the information may indicate cores C1 and C2 of processor 1 and C1 of processor 2, etc. In another embodiment, the information received in 306 may simply identify the number of cores to be allocated to the virtual machine and the specified number of cores may then be automatically identified from the available cores and allocated to the virtual machine.

Other configuration information may be received for the virtual machine to be created (step 308). The configuration information may, for example, comprise information identifying a context for the virtual machine. The context information may include identifying a set of source addresses, a set of services (e.g., web traffic forwarding, security handling, load balancing, etc.), IP addresses, L2 VLAN information, destination addresses, or other information. In one embodiment, the configuration information for a virtual machine may identify the type of data traffic to be forwarded to the virtual machine for processing. The configuration information stored for multiple virtual machines is used to map a packet to a specific virtual machine and to one or more cores allocated to that virtual machine. In one embodiment, the information received in 304, 306, and 308 may be included in the request received in 302.

A virtual machine is then created based upon the information received in 304, 306, and 308 (step 310). As part of 310, configuration information may be stored for the virtual machine identifying the identifier to be used for referencing the virtual machine, information identifying the one or more cores allocated to the virtual machine, and other configuration information including context information for the virtual machine. As part of 310, the cores identified in 306 are allocated to the virtual machine that is configured. Further, as part of 310, the memory resources associated with the cores identified in 306 are automatically allocated to the virtual machine.

As can be seen from the processing depicted in FIG. 3, the user does not have to worry about allocating memory resources for the virtual machine that is created. By simply identifying the cores to be allocated for the virtual machine, the memory resources associated with those cores are automatically allocated to the virtual machine. This makes it very easy to configure virtual machines.

Figure 4:
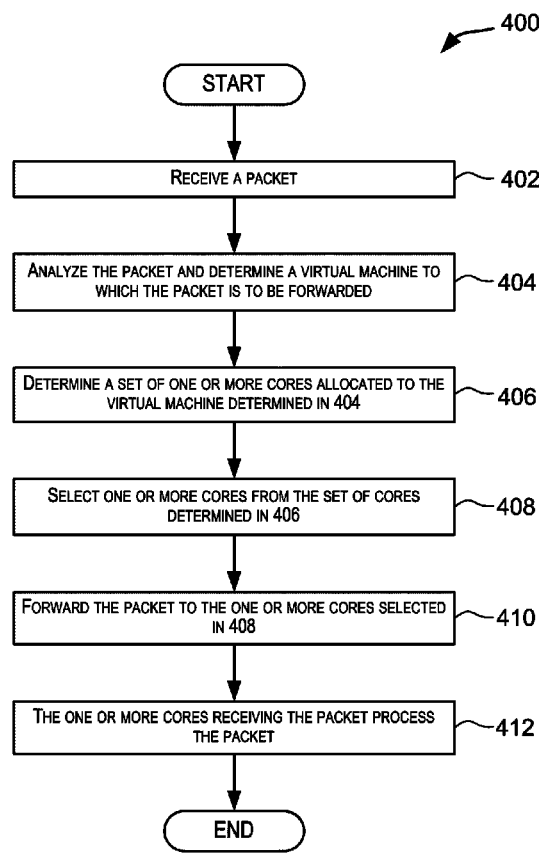
FIG. 4 depicts a high level simplified flowchart depicting a method performed by a network device providing core-based virtualization upon receiving a packet according to an embodiment of the present invention.

FIG. 4 depicts a high level simplified flowchart 400 depicting a method performed by a network device providing core-based virtualization upon receiving a packet according to an embodiment of the present invention. The processing depicted in flowchart 400 may be performed in software (e.g., instructions, code, program) executed by a processor, in hardware, or in combinations thereof. The software may be stored on a computer-readable storage medium.

As depicted in FIG. 4, the processing may be initiated when a network device receives a packet (step 402). For example, the processing may be initiated when an I/O subsystem of the network device receives a data packet.

The packet is then analyzed to determine a virtual machine to which the packet is to be forwarded (step 404). In one embodiment, the I/O subsystem may extract contents of the received packet and use the extracted contents to determine the one or more virtual machines to which the packet is to be forwarded for processing. For example, the header of the packet or portions thereof may be extracted and used to determine a virtual machine for processing the packet. Configuration information stored for the virtual machines supported by the network device may be used to determine the one or more virtual machines. For example, based upon the analysis of the contents of the packet, the network device may determine a type of service to be performed for the packet and then identify a virtual machine configured to provide that service. As another example, the network device may determine a data stream to which the packet belongs and identify a virtual machine that is configured to process that data stream. In one embodiment, memory lookups (e.g., CAM lookups, table lookups) may be performed using the information extracted from the packet to determine the virtual machine in 404.

A set of one or more cores allocated to the virtual machine determined in 404 is then determined (step 406). This may be determined from information related to the virtual machine stored by the network device. In one embodiment, one or more memory lookups (e.g., CAM lookups, table lookups) may be performed using the information extracted from the packet to determine both the virtual machine and the set of cores corresponding to the determined virtual machine. The CAMs and/or tables may be configured using configuration information 118 to enable the lookups.

One or more cores may then be selected from the set one or more cores determined in 406 (step 408). In one embodiment, a single core is selected from the set of cores. Various different factors or techniques may be used for selecting the one or more cores in 408 from the set of cores determined in 406. In one embodiment, load balancing processing may be performed on the cores identified in 406 to select a core from the set of cores. In an alternative embodiment, one or more of the cores in the set of cores determined in 406 may be selected in 408.

In one embodiment, memory lookups (e.g., CAM lookups, table lookups) may be performed to select the one or more cores in 408. For example, one or more memory lookups may be performed using the information extracted from the packet to determine one or more cores to which the packet is to be forwarded. The CAMs and/or tables may be configured using configuration information 118 to enable the lookups.

The packet is then forwarded to the one or more cores identified in 408 (step 410). Different techniques may be used to forward the packet to the selected one or more cores. In one embodiment, the I/O subsystem of the network device forwards the packets to a switch fabric, which is then configured to write the packet to the memory resources associated with the one or more cores selected in 408. The packet may be stamped with the one or more cores to which the packet is to be sent. In some embodiments, the packet may be forwarded to all the cores determined in 406. In such an embodiment, the selecting step of 408 may not be required.

The one or more cores receiving the packet may then process the packet (step 412). In one embodiment, the memory resources associated with the one or more cores are used for processing the packet.

In one embodiment, the processing depicted in steps 402, 404, 406, 408 and 410 may be performed by an I/O subsystem of the network device.

Although steps 404, 406, and 408 are shown as separate steps in FIG. 4, the processing may be performed in a single step wherein the information extracted from the packet is used to perform lookups in one or more CAMs or tables and the lookups yield one or more cores to which the packet is to be forwarded. The CAMs and tables may be configured based upon configuration information related to the virtual machines such that lookups in the CAM yield the one or more cores to which the packet is to be forwarded. For example, for the embodiment depicted in FIG. 1, the CAMs or tables may be configured by management subsystem 108 based upon configuration information 118.

By providing core-based virtualization, as described above, a network device may be partitioned into multiple virtual machines, with each virtual machine acting as a separate network device. Each virtual machine may act as an instance of the network device (e.g., virtual ADC instances) providing all or a subset of features provided by the network device. The virtual machines within a network device may be configured to perform the same or different types of processing. A virtual machine may be treated just as another network device and be allocated network interfaces and VLANs, load balancing objects, policies and health checks. Users and user roles may be created for the virtual machines. Each virtual machine may have sufficient parameters to define maximum values for key variables by the global administrator.

Various tools (e.g., graphical user interfaces (GUIs), command-line interfaces (CLIs)) may be provided for obtaining information about virtual machines configured for a network device. The information that may be obtained for a virtual machine may include the identifier for the virtual machine, the cores allocated to the virtual machine, the type of data to be forwarded to the virtual machine for processing, types of services provided by the virtual machine, statistical information for the virtual machine, and the like. The information may be obtained for particular one or more virtual machines or for all the virtual machines globally defined.

In one embodiment, different functions or applications may be assigned to the different virtual machines configured for a network device. Further, a virtual machine is shielded from other virtual machines that may be configured for the network device. The virtual machines thus provide for application/function isolation within a network device while maintaining the performance and quality of service characteristics. The shielding also provides for security isolation. For example, for a virtual machine, any crash or failure of one or more cores allocated to that virtual machine does not affect the continued operation of other virtual machines. In this manner, one virtual machine is shielded from other virtual machines. For example, activities such as reconfiguration of a virtual machine, disabling/enabling a virtual machine, editing the virtual machine in any way, etc. do not affect the working of other virtual machines configured for the network device. Further, total system scaling does not change with virtualization configured for a network device. The same system maximums still apply, but will get divided amongst the virtual machines.

Core-based virtualization provides elasticity in provisioning resources for applications (e.g., business applications) within a single chassis of a network device while ensuring that the flexibility also provides the same performance, security, and quality of service characteristics of a single instance of the platform. By dynamically aggregating a group of processor cores and their associated compute resources, core-based virtualization enables a network device to act as multiple network devices. This gives users (e.g., business enterprises) of a network device a hardware solution that allows a single network device to act as if there are multiple network devices with minimal performance degradation, software systems overhead, and operational overhead of defining an entire class of resources that are rate-limited. For example, if the network device is an ADC, different virtual ADCs may be configured for performing different functions. Different SLAs may be provided for the different functions while providing the performance guarantee and providing security isolation among the functions/applications. These are building blocks of cloud computing that requires such an adaptive infrastructure. Core-based virtualization also offers the scalability desired by users such as service providers of voice, video, data that need the ability to ramp up quickly as new customers join. This helps them in scaling and changing to business needs quickly, while promoting performance and security isolation.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

For example, while the various embodiments described above have been in the context of network devices, the teachings herein may be applied to other computing devices besides networking devices and may be used in different domains other than networking. For instance, teachings of the present invention may be applicable in a computing device application, such as a PC or a server or a super computer, having one or more processors with multiple cores, each core having associated memory resources.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A network system comprising:
a data subsystem comprising a first processor comprising a first core and a second processor comprising a second core,
the first processor being physically separate from the second processor, each core having associated memory resources, the memory resources for each core being accessible by the other core, and the memory resources for each respective core being associated with the core prior to receiving a request to configure a virtual machine, wherein the virtual machine is one of a plurality of virtual machines; and a management subsystem coupled to the data subsystem and configured to:

receive the request to configure the virtual machine, the request comprising configuration information including context information for the virtual machine and identifying the first core and the second core to be allocated to the virtual machine; and configure the virtual machine based upon the request, wherein the virtual machine is configured by allocating the first core and the second core to the virtual machine, and applying core-trunking across the cores on the first and the second processor, and the memory resources pre-associated with the first core and the second core prior to receiving the request.

2. The network system of claim 1 wherein an I/O subsystem is configured to:

extract contents from a packet; and perform a lookup using the extracted contents to determine a core for processing the packet.

3. The network system of claim 1, further comprising an Input/Output (I/O) subsystem configured to:

receive a packet;

determine a first virtual machine from the plurality of virtual machines by analyzing the packet;

determine a set of one or more cores allocated to the first virtual machine, using configuration information for the first virtual machine; and determine a core for processing the packet from the set of one or more cores, using the configuration information.

4. The network system of claim 1, further comprising a memory configurable to store the configuration information for the virtual machine, the memory separate from the memory resources associated with the first and the second cores.

5. The network system of claim 1, further comprising a second subsystem configurable to receive a packet and cause the packet to be forwarded to a core from the first and the second cores allocated to the virtual machine.

6. The network system of claim 1, further comprising a second subsystem configurable to receive a packet and cause contents of the packet to be written to the memory resources pre-associated with a core from the first or the second core allocated to the virtual machine.

7. A method performed by a network device comprising: storing, at the network device, configuration information for a set of virtual machines configured for the network device;

wherein, for at least one virtual machine from a plurality of virtual machines, the configuration information comprises:

context information for the at least one virtual machine, information identifying a first core from a first processor and a second core from a second processor by applying core-trunking across the cores on the first processor and the second processor, the first processor being physically separate from the second processor, the first and second cores allocated to the at least one virtual machine, each core having associated memory resources, the memory resources for each core being accessible by at least another core from the plurality of cores, and the memory resources for each respective core being associated with the core prior to allocation of the core to the at least one virtual machine, and wherein, for the at least one virtual machine from the plurality of virtual machines, the memory resources pre-associated with the first and the second cores allocated to the at least one virtual machine are allocated for the at least one virtual machine; and causing, by the network device, a packet to be forwarded to a core from the first and the second cores allocated to the virtual machine from the plurality of virtual machines.

8. The method of claim 7 wherein the causing the packet to be forwarded comprises:

extracting contents from the packet; and determining the core based upon the extracted contents.

9. The network device of claim 8 wherein the determining comprises:

performing one or more lookups in one or more memories in the network device using the extracted contents to determine the core.

10. The method of claim 8 further comprises:

forwarding the packet to a switch fabric of the network device after determining the core based upon the extracted contents; and forwarding the packet from the switch fabric to the core.

11. The method of claim 7 wherein the causing the packet to be forwarded comprises writing the packet to the memory resource pre-associated with the core.

12. The method of claim 7 wherein the causing the packet to be forwarded comprises:

determining the at least one virtual machine from the plurality of virtual machines by analyzing the packet;

determining the first and the second cores allocated to the at least one virtual machine; and determining the first core from the first and the second cores to forward the packet to.

13. A computer-readable memory storing a plurality of instructions for controlling a network device comprising a first processor and a second processor, the plurality of instructions comprising:

instructions that cause the network device to store configuration information by applying core-trunking across cores of the first processor and the second processor for a set of virtual machines configured for the network device;

wherein, for at least one virtual machine in the set of virtual machines, the configuration information comprises:

context information for the at least one virtual machine, information identifying a set of one or more cores comprising a first core from the first processor and a second core from the second processor, the first processor being physically separate from the second processor, allocated to the at least one virtual machine, the set of one or more cores provided by one or more processors of the network device, each core in the set of one or more cores having associated memory resources, the memory resources for each core being accessible by at least another core from the set of one or more cores, and the memory resources for each respective core being associated with the core prior to allocation of the core to the at least one virtual machine, and wherein, for at least one virtual machine in the set of virtual machines, the memory resources pre-associated with the set of one or more cores allocated to the at least one virtual machine are allocated for the at least one virtual machine;

instructions that cause the network device to cause a packet to be forwarded to a core from a set of one or more cores allocated to the at least one virtual machine from the set of virtual machines.

14. The computer-readable memory of claim 13 wherein the instructions that cause the processor to cause the packet to be forwarded to the core comprise:
    instructions that cause the network device to extract contents from the packet; and
    instructions that cause the network device to determine the core based upon the extracted contents.

15. The computer-readable memory of claim 14 wherein the instructions that cause the network device to determine the core comprise instructions that cause the network device to perform one or more lookups in one or more memories using the extracted contents to determine the core.

16. The computer-readable memory of claim 14 wherein the instructions that cause the network device to cause the packet to be forwarded to the core comprise:
    instructions that cause the network device to forward the packet to a switch fabric of the network device after determining the core based upon the extracted contents; and
    instructions that cause the packet to be forwarded from the switch fabric to the core.

17. The computer-readable memory of claim 13 wherein the instructions that cause the network device to cause the packet to be forwarded to the core comprise instructions that cause the packet to be written to the memory resource pre-associated with the core.

18. The computer-readable memory of claim 13 wherein instructions that cause the network device to cause the packet to be forwarded to the core comprise:
    instructions that cause the network device to determine the at least one virtual machine from the set of virtual machines by analyzing the packet;
    instructions that cause the network device to determine the set of one or more cores allocated to the at least one virtual machine; and
    instructions that cause the processor to determine the first core from the set of one or more cores allocated to the at least one virtual machine.

19. A method comprising:
    responsive to a request to configure a virtual machine based upon a set of cores provided by a set of processors of a network device, accessing, at the network device, information, derived by applying core-trunking on the set of cores provided by the set of processors, including context information for the virtual machine and identifying a first processor comprising a first core and a second processor comprising a second core from the set of cores to be allocated for the virtual machine to be configured, wherein the first processor and the second processors are physically separate processors;
    configuring the virtual machine, the configuring comprising allocating the one or more cores and memory resources associated with each core to the virtual machine,
    wherein the memory resources associated with each respective core is accessible by at least another core from the set of cores and are not identified in the request or in the information, the memory resources for a core being associated with the core prior to allocation of the core to a virtual machine.

20. A system comprising:
    a memory; and
    a processor configured to:
        access, responsive to a request to configure a virtual machine based upon a set of cores provided by a set of processors of a network device, configuration information, derived by applying core-trunking on the set of cores provided by the set of processors, including context information for the virtual machine and identifying a first processor comprising a first core and a second processor comprising a second core from the set of cores to be allocated for the virtual machine to be configured, wherein the first processor and the second processors are physically separate processors;
        cause the virtual machine to be configured that is allocated the first and the second cores and memory resources associated with the first and the second cores; and
        store the configuration information in the memory related to the virtual machine, wherein the memory resources associated with the first and the second cores are not identified in the request or in the configuration information, the memory resources for each core being accessible by at least another core from the plurality of cores, and the memory resources for each respective core being associated with the core prior to allocation of the core to a virtual machine.

* * * * *